(12) United States Patent
Gibson et al.

(10) Patent No.: US 9,180,861 B2
(45) Date of Patent: *Nov. 10, 2015

(54) METHOD AND SYSTEM FOR ENGINE CONTROL

(71) Applicant: Ford Global Technologies, LLC, Dearborn, MI (US)

(72) Inventors: Alex O'Connor Gibson, Ann Arbor, MI (US); Felix Nedorezov, Rochester Hills, MI (US); Chad Everette Griffin, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/081,636

(22) Filed: Nov. 15, 2013

(65) Prior Publication Data

US 2014/0080669 A1    Mar. 20, 2014

Related U.S. Application Data

(63) Continuation of application No. 13/171,358, filed on Jun. 28, 2011, now Pat. No. 8,591,379.

(51) Int. Cl.
*F16H 61/02* (2006.01)
*B60W 10/10* (2012.01)
*B60W 10/02* (2006.01)
(Continued)

(52) U.S. Cl.
CPC .............. *B60W 10/10* (2013.01); *B60W 10/026* (2013.01); *B60W 10/06* (2013.01); *B60W 10/115* (2013.01); *B60W 30/18018* (2013.01); *F02N 11/0844* (2013.01); *F16H 61/0213* (2013.01); *F16H 61/16* (2013.01); *B60W 2510/0638* (2013.01); *B60W 2520/04* (2013.01); *B60W 2520/10* (2013.01); *B60W 2540/10* (2013.01); *B60W 2540/12* (2013.01); *B60W 2550/142* (2013.01); *B60W 2710/025* (2013.01); *B60W 2710/1005* (2013.01); *B60W 2710/105* (2013.01); *B60Y 2300/48* (2013.01); *F02N 2200/022* (2013.01); *F02N 2200/0802* (2013.01); *F02N 2200/101* (2013.01); *F02N 2200/102* (2013.01); *F16H 2061/0234* (2013.01); *F16H 2312/14* (2013.01); *Y02T 10/48* (2013.01); *Y10T 477/688* (2015.01)

(58) Field of Classification Search
CPC ................. F02N 11/0844; F02N 2200/0802; F02N 2200/102; F02N 2200/101; B60W 10/10; B60W 10/115; Y10T 477/688; F16H 61/0213
See application file for complete search history.

(56) References Cited

U.S. PATENT DOCUMENTS

| 4,539,643 A | 9/1985 | Suzuki et al. |
| 6,190,284 B1 | 2/2001 | Kuroda et al. |

(Continued)

FOREIGN PATENT DOCUMENTS

| EP | 1 069 346 A2 | 1/2001 |
| EP | 1 344 673 A2 | 9/2003 |

*Primary Examiner* — Sherry Estremsky
(74) *Attorney, Agent, or Firm* — Julia Voutyras; Alleman Hall McCoy Russell & Tuttle LLP

(57) ABSTRACT

Methods and systems are provided for restarting an engine in response to a driver's change-of-mind. In one embodiment, the engine is shutdown during an idle stop with the transmission in a higher gear or with the transmission tied-up to a transmission case. In response to a driver change-of-mind restart request, the transmission is downshifted, or released from the tie-up, to return driveline torque.

11 Claims, 6 Drawing Sheets

(51) Int. Cl.
  *B60W 10/06* (2006.01)
  *B60W 10/115* (2012.01)
  *B60W 30/18* (2012.01)
  *F02N 11/08* (2006.01)
  *F16H 61/16* (2006.01)

(56) References Cited

U.S. PATENT DOCUMENTS

| | | |
|---|---|---|
| 6,334,834 B1 | 1/2002 | Mizutani et al. |
| 6,344,834 B1 | 2/2002 | Josypenko |
| 6,951,525 B2 | 10/2005 | Ries-Mueller |
| 6,959,238 B2 | 10/2005 | Morishita et al. |
| 7,243,011 B2 | 7/2007 | Koenig et al. |
| 7,316,631 B2 | 1/2008 | Tsunekawa |
| 7,329,206 B2 | 2/2008 | Tanaka |
| 7,683,503 B2 | 3/2010 | Yamaguchi |
| 8,112,208 B2 | 2/2012 | McGee et al. |
| 8,192,328 B2 | 6/2012 | Nedorezov et al. |
| 8,414,456 B2 | 4/2013 | Nedorezov et al. |
| 8,591,379 B2 * | 11/2013 | Gibson et al. ............ 477/115 |
| 2005/0133006 A1 | 6/2005 | Frenz et al. |
| 2011/0053735 A1 | 3/2011 | Lewis et al. |
| 2011/0054765 A1 | 3/2011 | Lewis et al. |
| 2012/0010792 A1 | 1/2012 | Nedorezov et al. |

* cited by examiner

METHOD AND SYSTEM FOR ENGINE CONTROL

CROSS REFERENCE TO RELATED APPLICATIONS

The present application is a continuation of U.S. patent application Ser. No. 13/171,358, entitled "METHOD AND SYSTEM FOR ENGINE CONTROL," filed on Jun. 28, 2011, the entire contents of which are hereby incorporated by reference for all purposes.

FIELD

The present application relates to methods and systems for controlling an engine shutdown and a subsequent engine restart.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like.

In some instances, a driver may have a change-of-mind while the engine is being shut down (e.g., still spinning down) and may wish to immediately restart the engine. In engines with an automatic transmission including a torque converter, the drop and subsequent sudden increase in engine speed during the change-of-mind engine restart can create a negative torque spike at the torque converter output, which is experienced as a clunk or bump by the vehicle operator. As such, the drive feel and engine startability is reduced.

Thus in one example, the above issue may be at least partly addressed by a method of controlling an engine coupled to a transmission. In one embodiment, the method comprises, during an automatic engine idle-stop, operating the transmission in a first, higher gear, and in response to a driver change-of-mind restart, shifting the transmission to a second, lower gear. Herein, the first higher gear may have a lower gear ratio enabling lower torque multiplication while the lower gear may have a higher gear ratio enabling higher torque multiplication.

In another embodiment, the method comprises, in response to an automatic engine idle-stop, tying up the transmission to a transmission case, and in response to a driver change-of-mind restart, releasing the transmission from the tie-up. In this way, a transmission output torque may be reduced during an engine idle-stop when the engine is spinning towards rest. Further, if the driver changes his mind and wishes to restart the engine before the engine has comes to rest, the torque reduction may be decreased to restore driveline torque while reducing the effects of the change-of-mind restart torque spike.

For example, during an engine idle-stop, the engine may be deactivated, and while the engine is spinning to rest (but before the engine has stopped), the transmission may be shifted (e.g., upshifted) to a higher gear (such as a transmission second gear). Additionally, or optionally, one or more transmission clutches may be engaged to lock the transmission to a transmission case. If the driver changes his mind and wishes to restart the engine before the engine has stopped, and while the engine speed is still above a threshold speed, the transmission may be downshifted to a lower gear (such as the transmission first gear) and/or the clutch pressure may be adjusted to unlock the transmission. If the driver changes his mind below the threshold speed, the downshifting and/or unlocking may be delayed until the engine has come to rest, restarted with starter motor assistance speed, and brought to the threshold speed.

In this way, the transmission output torque may be modulated during an engine idle-stop and a subsequent driver change-of-mind restart to reduce a negative torque spike experienced during the restart. By reducing the negative torque spike, clunks or bumps experienced by a vehicle operator, during a restart responsive to a driver's change-of-mind, can be reduced to improve the quality of the restart.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
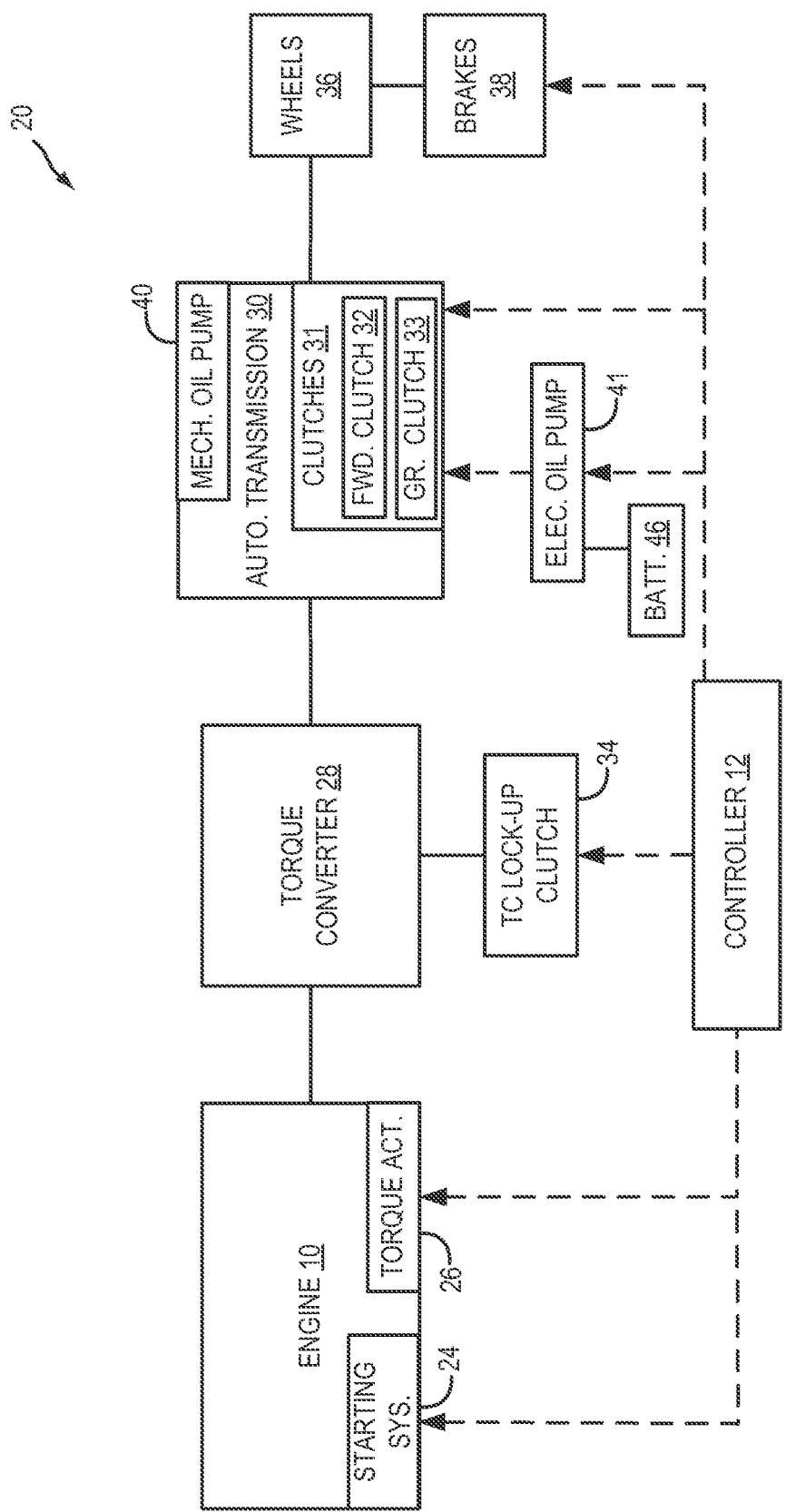
FIG. 1 shows an example vehicle system layout, including details of a vehicle drive-train.
Figure 2:
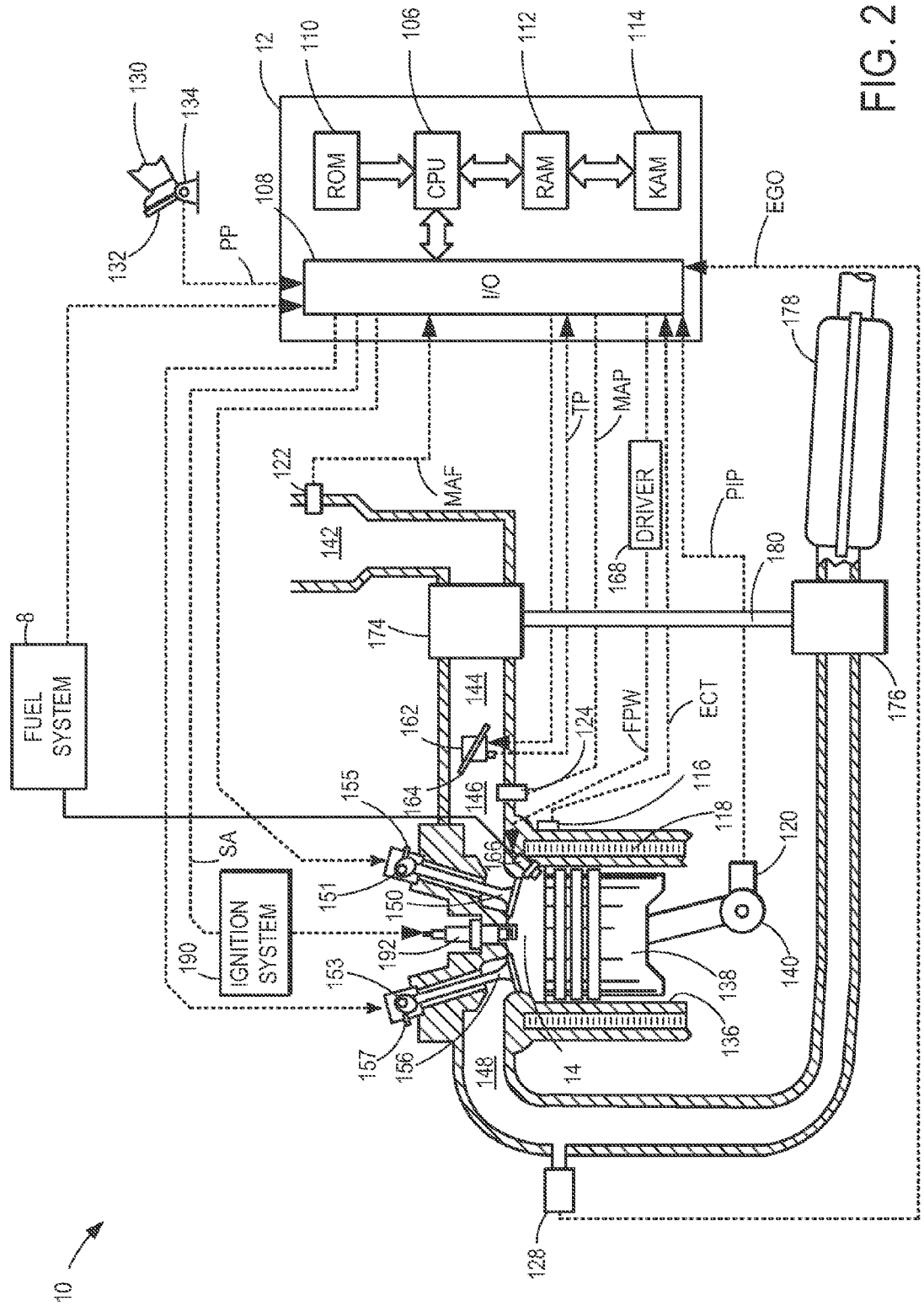
FIG. 2 shows a partial engine view.

The following description relates to systems and methods for controlling a vehicle engine system that is selectively deactivatable in response to idle-stop conditions (such as the engine system of FIGS. 1-2). The engine system may be coupled to a transmission including a torque converter. In response to idle-stop conditions, the engine is shutdown with an amount of torque conveyed from the rotating engine, across the transmission, to the vehicle wheels, being reduced. In response to a vehicle launch request from the operator, the torque reduction is decreased after a threshold engine speed is reached to reduce the effects of a negative restart torque spike and to expedite the return of driveline torque. An engine controller may be configured to perform control routines, such as the routine of FIG. 3, to shutdown the engine during idle-stop conditions with the transmission operating in a higher gear and/or the transmission tied-up to a case of the transmission. In response to a driver change-of-mind restart requested while the engine is spinning towards rest during the idle-stop, the controller may perform a control routine, such as the routine of FIG. 4, to downshift the transmission and/or release the transmission from the tie-up to return driveline torque. A timing of the downshifting and/or release may be based at least on an engine speed at which the change-of-mind restart request is received. The concepts and routines introduced herein are further clarified with example engine change-of-mind restart scenarios in FIGS. 5A-C. In this way, clunks and bumps experienced by the driver during a change-of-mind restart can be reduced and the drive feel can be improved.

FIG. 1 is a block diagram of a vehicle drive-train 20. Drive-train 20 may be powered by engine 10. Engine 10 may be started with an engine starting system 24 including a motor-driven starter, for example. The starter motor may be operated using current from battery 46, for example. Further, engine 10 may generate or adjust torque via torque actuator 26, such as a fuel injector, throttle, etc.

An engine output torque may be transmitted to torque converter 28 to drive an automatic transmission 30. Further, one or more clutches 31 may be engaged, including forward clutch 32, to propel a vehicle. In one example, the torque converter 28 may be referred to as a component of the transmission 30. Further, transmission 30 may include a plurality of gear clutches 33 that may be engaged as needed to activate a plurality of fixed transmission gear ratios. Specifically, by adjusting the engagement of the plurality of gear clutches 33, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. As elaborated herein, a controller may vary the transmission gear (e.g., upshift or downshift the transmission gear) to adjust an amount of torque conveyed across the transmission and torque converter to vehicle wheels 36 (that is, an engine shaft output torque).

Likewise, under selected conditions, one or more clutches 31 may be applied to tie-up the transmission to a transmission case or housing, and thereby to a frame of the vehicle. The tie-up may be a "hard" tie-up with a higher tie-up torque. Alternatively, the tie-up may be a "soft" tie-up wherein one or more of the clutches are slipped to apply a lower tie-up torque. In one example, as elaborated below, the transmission may be tied up during an engine idle-stop to provide a braking torque to hold the vehicle stationary. The transmission may then be released from the tie-up during or after an engine restart responsive to automatic restart conditions or a driver change-of-mind restart request.

The output of the torque converter may be controlled by torque converter lock-up clutch 34. For example, when torque converter lock-up clutch 34 is fully disengaged, torque converter 28 transmits engine torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter clutch to an input shaft (not shown) of transmission 30. Alternatively, the torque converter lock-up clutch 34 may be partially engaged, thereby enabling the amount of torque relayed to the transmission to be adjusted. A controller 12 may be configured to adjust the amount of torque transmitted by torque converter 28 by adjusting the torque converter lock-up clutch in response to various engine operating conditions, or based on a driver-based engine operation request. In one example, an engine operation request may be received from the vehicle operator via an accelerator pedal and/or a brake pedal (shown in FIG. 2), as further described herein. Torque output from the automatic transmission 30 may in turn be relayed to wheels 36 to propel the vehicle. Specifically, automatic transmission 30 may transfer an input driving torque at the input shaft (not shown) responsive to a vehicle traveling condition before transmitting an output driving torque to the wheels.

Further, a frictional force may be applied to wheels 36 by engaging wheel brakes 38. In one example, wheel brakes 38 may be engaged in response to the driver pressing his foot on a brake pedal. In the same way, a frictional force may be reduced to wheels 36 by disengaging wheel brakes 38 in response to the driver releasing his foot from the brake pedal. Further, vehicle brakes may apply a frictional force to wheels 36 as part of an automated engine stopping procedure. In some examples, the transmission may be tied-up to a transmission housing to assist the vehicle brakes in holding the vehicle stationary.

A mechanical oil pump 40 may be in fluid communication with automatic transmission 30 to provide hydraulic pressure to engage the various clutches 31, such as forward clutch 32, gear clutches 33, and/or torque converter lock-up clutch 34. Mechanical oil pump 40 may be operated in accordance with torque converter 28, and may be driven by the rotation of the engine or transmission input shaft, for example. Thus, the hydraulic pressure generated in mechanical oil pump 40 may increase as an engine speed increases, and may decrease as an engine speed decreases. An electric oil pump 41, also in fluid communication with the automatic transmission but operating independent from the driving force of engine 10 or transmission 30, may be provided to supplement the hydraulic pressure of the mechanical oil pump 40. Electric oil pump 41 may be driven by an electric motor (not shown) to which an electric power may be supplied, for example by battery 46.

A controller 12 may be configured to receive inputs from engine 10, as shown in more detail in FIG. 2, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 12 may initiate an engine shutdown by shutting off fuel and spark to the engine. To increase the vehicle load perceived by the engine, the controller may operate the transmission in a higher gear during the idle-stop. For example, the controller may maintain the transmission in a higher gear or upshift the transmission to a higher gear during the engine idle-stop. Further, to maintain an amount of torsion in the transmission and assist in holding the vehicle at rest, the controller may ground rotating elements of transmission 30 to a case of the transmission and thereby to the frame of the vehicle. As further elaborated below, when the engine is below a threshold speed, the controller may engage one or more transmission clutches, such as forward clutch 32, and lock the engaged transmission clutch(es) to the transmission case and vehicle frame. A clutch pressure may be varied (e.g., increased) to adjust the engagement state of a transmission clutch, and provide a desired amount of transmission torsion. Likewise, the controller may adjust the clutch pressure of one or more gear clutches 33 to shutdown the engine with the transmission in the higher gear. During the engine shutdown, hydraulic pressure for clutch modulation and transmission gear shifting may be provided by enabling electric oil pump 41, if sufficient hydraulic pressure cannot be provided by mechanical oil pump 40.

During the idle-stop operation, while the engine is spinning down to rest but before the engine has stopped, the driver may change his mind and indicate a desire to restart the engine (for example, by releasing the brake pedal and/or pressing the accelerator pedal). If the engine is above a threshold speed when the change-of-mind restart request is received, cylinder fuel injection and spark may be returned to restart the engine. Additionally, driveline torque may be substantially immediately restored by downshifting the transmission to a lower gear (having a higher gear ratio) and/or releasing the transmission from the tie-up.

In comparison, if the driver change-of-mind restart request is received below the threshold speed (e.g., below the idling speed), cylinder fuel injection and spark may be returned to restart the engine while the transmission is operated in the higher gear (e.g., upshifted to the higher gear) and/or tied-up to a transmission case for a duration of the restart. Herein, by tying up the transmission and/or upshifting the transmission, an amount of torque conveyed from the rotating engine to the vehicle wheels across the torque converter can be decreased during the engine speed run-up. Then, after the engine speed has increased to or beyond the threshold speed, the transmission may be downshifted and/or released from the tie-up. As such, if the driver change-of-mind restart request is received below the threshold speed and below a predetermined engine shutdown speed (below which the engine requires a starter for cranking), the transmission may remain upshifted and/or tied-up for a longer duration until the engine has been restarted with the starter and has crossed the threshold speed, after which the transmission may be downshifted and/or released from the tie-up. In this way, a torque converter output torque spike experienced during the engine restart speed spike can be decreased.

If no driver change-of-mind restart request is received during the idle-stop as the engine speed falls below the predetermined engine shutdown speed, the engine may be maintained in the idle-stop until automatic engine restart conditions are met. Optionally, the transmission may be released from the tie-up and the transmission may be released from gear (e.g., placed in a parking gear) while the vehicle is stationary and the engine is at rest. Example engine restarts in response to a driver change-of-mind are elaborated herein with reference to FIGS. 5A-C.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 199, intake/exhaust valves and cams, etc. The controller may receive input data from the various sensors, process the input data, and trigger the actuators in response to the processed input data based on instruction or code programmed therein corresponding to one or more routines. Example control routines are described herein with regard to FIGS. 3-4.

Figure 3:
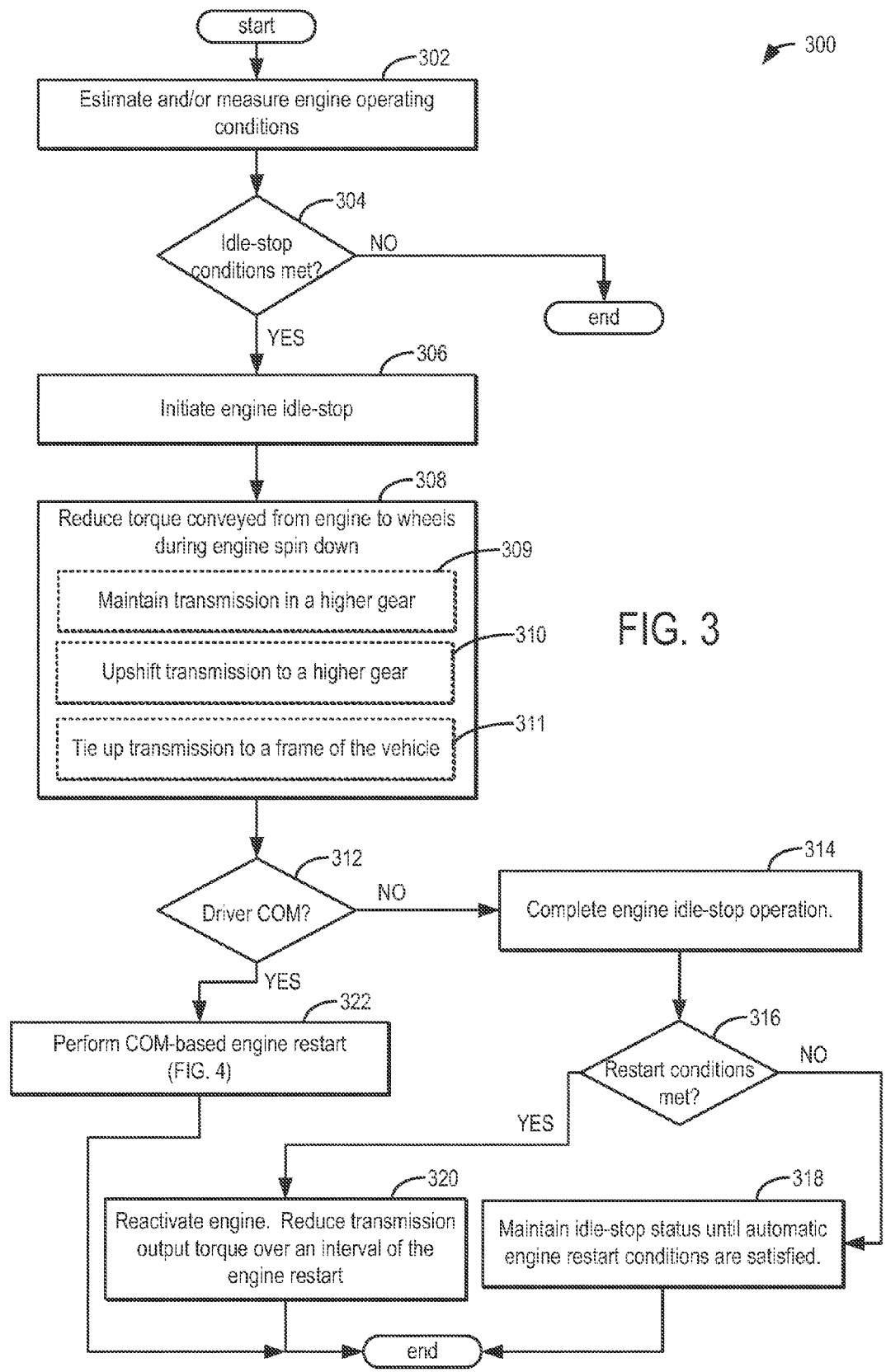
FIG. 3 shows a high level flow chart for shutting down and restarting an engine, according to the present disclosure.

Now turning to FIG. 3, an example routine 300 is described for automatically shutting down an engine in response to idle-stop conditions, and restarting the engine in response to restart conditions. The routine enables the engine to be shut-down with the transmission tied up and/or with a transmission gear shifted until a driver change-of-mind restart is requested and/or automatic engine restart conditions are met.

At 302, engine operating conditions may be estimated and/or measured. These may include, for example, ambient temperature and pressure, engine temperature, engine speed, crankshaft speed, transmission speed, battery state of charge, fuels available, fuel alcohol content, etc.

At 304, it may be determined if engine idle-stop conditions have been met. Idle-stop conditions may include, for example, the engine operating (e.g., carrying out combustion), the battery state of charge being above a threshold (e.g., more than 30%), vehicle speed being below a threshold (e.g., no more than 30 mph), no request for air conditioning being made, engine temperature (for example, as inferred from an engine coolant temperature) being above a threshold, no start being requested by the vehicle driver, driver requested torque being below a threshold, accelerator pedal not being pressed, brake pedal being pressed, etc. If idle-stop conditions are not met, the routine may end.

If any or all of the idle-stop conditions are met, then at 306, the controller may initiate an automatic engine idle-stop operation to deactivate and shut down the engine. This may include shutting off fuel injection and/or spark ignition to the engine. Upon deactivation, the engine may start spinning towards rest.

At 308, while the engine is spinning towards rest (for example, when the engine speed is below a threshold speed but before the engine is at rest), the engine controller may reduce a transmission output torque conveyed from the spinning engine to the vehicle wheels across the transmission and the torque converter. In one example, this may include, at 309, if the transmission is already in a higher gear (e.g., a gear higher than the transmission first gear) when the engine reaches the threshold speed, maintaining the transmission in the higher gear. For example, if the transmission is in a transmission second gear (gear_2) when the engine reaches the threshold speed, the transmission may be maintained in the second gear. In another example, reducing the transmission torque may include, at 310, if the transmission is in a lower gear (e.g., a transmission first gear having a higher gear ratio) when the engine reaches the threshold speed, shifting the transmission (e.g., upshifting the transmission) to a higher gear (having a lower gear ratio) during the engine idle-stop. For example, if the transmission is in a transmission first gear (gear_1) when the engine reaches the threshold speed, the transmission may be upshifted to a transmission third gear (gear_3). As such, shifting the transmission may include adjusting a clutch pressure of an appropriate transmission gear clutch (such as gear clutch 33 of FIG. 1). Since the higher gear has a lower gear ratio than the lower gear, by upshifting the transmission during the engine shutdown, the vehicle load perceived by the engine is increased due to the gear ratio difference between the selected transmission gears. The increased perceived vehicle load may reduce the negative torque spike experienced as a clunk by the vehicle operator during a subsequent engine restart. Furthermore, by shifting the transmission gears during the idle-stop, the transmission may be prepositioned for a subsequent engine restart wherein the engine may be reactivated with the transmission in the higher gear and with a torque conveyed from the rotating engine to the vehicle wheels reduced. By reducing the transmission output torque over an interval of the subsequent engine restart, the engine restart torque spike may be reduced. In this way, clunks and other NVH issues related to the negative engine restart torque spike can be reduced, improving the quality of the restart. As such, in addition to shifting the transmission to the higher gear, clutch pressures and/or driveline pressures may be controlled so as to minimize the transmission of the negative torque spike during the restart.

In still another example, in place of, or in addition to the transmission gear shifting, at 311, the routine may include tying up the transmission to a transmission case, and thereby to a frame of the vehicle during the engine idle-stop. For example, when the engine has spun down to the threshold engine speed, the controller may engage one or more transmission clutches and lock the engaged transmission clutch(es) to the transmission case, and thereby to the vehicle frame. By tying up a transmission torque converter output shaft to the transmission housing, direct transfer of the torque converter output torque to the transmission output and the vehicle wheels is reduced. Additionally, the transmission tie-up may assist the vehicle brakes in holding the vehicle stationary during the engine idle-stop. By tying up the transmission during the engine shutdown, the transmission may also be prepositioned for a subsequent engine restart such that the engine may be reactivated with the transmission tied-up and with a torque conveyed from the rotating engine to the vehicle wheels reduced.

As such, the hydraulic pressure required to engage and lock the transmission clutch(es), and/or upshift the transmission to the higher gear may be provided by the mechanical oil pump, or the electric oil pump if sufficient hydraulic pressure cannot be provided by the mechanical oil pump.

At 312, while the engine is spinning down and before the engine has come to rest, it may be determined if a driver change-of-mind (COM) restart has been requested. As such, a driver change-of-mind restart includes the driver requesting an engine restart during an engine spin-down of the idle-stop, before the engine is at rest, and while the vehicle is stationary. For example, a driver change-of-mind restart request may be inferred in response to the driver releasing the brake pedal during the idle-stop operation while the engine is spinning towards rest, but before the engine has stopped. In another example, a driver change-of-mind restart request may be inferred in response to the driver pressing the accelerator pedal during the idle-stop operation while the engine is spinning towards rest, but before the engine has stopped.

If no driver change-of-mind restart is determined, then at 314, the routine includes completing the engine idle-stop operation. For example, if no change-of-mind restart occurs during the engine spin-down, then once the engine has passed through a lower engine speed threshold (or predetermined set-point), the engine may remain shutdown with the transmission in the higher gear. The lower threshold may correspond to an engine speed below which a driver change-of-mind restart may not be supported without first bringing the engine to a complete stop. Herein, the higher gear allows the engine to be restarted such that less engine torque may be transferred to the driveline when the engine is restarted in the higher gear.

Alternatively, the transmission may be downshifted from the first, higher gear to a second, lower gear (such as the transmission first gear (gear_1)) after the engine comes to rest to prepare for a subsequent automatic engine restart if no drive change-of-mind restart is requested during the idle-stop. Likewise, if no change-of-mind restart occurs during the engine spindown, then once the engine has passed through the lower engine speed threshold, the engine may remain shutdown with the transmission tied-up to the transmission case. Alternatively, the transmission may be released from the tie-up and tied-up again during a subsequent automatic engine restart. Further still, the engine may be tied up by applying a plurality of clutches (e.g., three clutches) during the engine stop, and if no change-of-mind restart occurs during the engine spin-down, the transmission may remain tied up until the engine is restarted. Likewise, the transmission may be tied up with a first amount of clutch slippage during the engine stop, and if no change-of-mind restart occurs during the engine spin-down, then once the engine has passed through the lower engine speed threshold, the amount of clutch slippage may be decreased to a second, lower amount of clutch slippage so as to increase the tie-up torque and thereby limit vehicle movement.

At 316, after the engine shutdown has been completed, it may be determined whether any automatic engine restart conditions have been met. As such, an automatic engine restart includes automatically restarting the engine in response to restart conditions being met and without receiving a restart request from the vehicle operator. Automatic engine restart conditions may include, for example, the engine being in idle-stop (e.g., not carrying out combustion), the battery state of charge being below a threshold (e.g., less than 30%), vehicle speed being above a threshold, a request for air conditioning being made, engine temperature being below a threshold, emission control device temperature being below a threshold (e.g., below a light-off temperature), vehicle electrical load being above a threshold, etc. If restart conditions are not met, at 318, the engine may be maintained in the shutdown condition with the transmission shifted to the higher gear and/or the transmission tied-up until automatic engine restart conditions are met.

In comparison, if any or all of the automatic restart conditions are met, at 320, the engine may be automatically restarted. This may include reactivating and cranking the engine. In one example, the engine may be cranked with starter motor assistance. Additionally, fuel injection and spark ignition may be returned to the engine cylinders and cylinder combustion may be resumed. In response to the automatic reactivation, the engine speed may start to gradually increase. The engine may be restarted with an amount of transmission output torque conveyed from the spinning engine to the vehicle wheels via the transmission reduced over a duration of the restart. After the duration, the transmission output torque reduction may be decreased (e.g., stopped). The duration may correspond to a duration required for the engine to transition through the engine speed spike and reach an idling speed. For example, the engine may be restarted with the transmission in the higher gear (as prepositioned during the preceding idle-stop) and/or the transmission tied up until a threshold engine speed is reached (e.g., at or below idling speed), after which the transmission may be shifted to a lower gear (e.g., transmission first gear (gear_1)) and/or the transmission may be released from the tie-up to prepare the vehicle for a vehicle launch. By restarting the engine with some torque reduction over at least an interval of the restart, the vehicle may be better transitioned through the engine restart speed/torque spike with fewer NVH issues.

Returning to 310, if a driver change-of-mind restart is determined, then at 312, the controller may proceed to perform a change-of-mind based engine restart. As further elaborated in FIG. 4, in response to a driver change-of-mind restart request, the engine may be reactivated and the transmission may be downshifted before the engine comes to rest so as to prepare the vehicle for launch. Likewise, the transmission may be released from the state of tie-up In this way, an engine may be maintained in idle-stop with the transmission in a higher gear and/or with the transmission tied up to a transmission housing so as to provide at least some torque reduction during a subsequent engine restart. By prepositioning the transmission in the higher gear during the preceding idle-stop, the engine may be better transitioned through the engine restart negative torque spike. Further, if the driver changes his mind and wants to immediately restart and/or launch the vehicle, driveline torque can be substantially immediately returned by shifting the transmission to a lower gear and decreasing the torque reduction. Likewise, the vehicle may be held stationary with an amount of torsion in the transmission during the engine idle-stop by tying up the transmission to a transmission case. Then, in response to the driver change-of-mind restart request, the transmission may be released from the tie-up to expedite vehicle launch.

Figure 4:
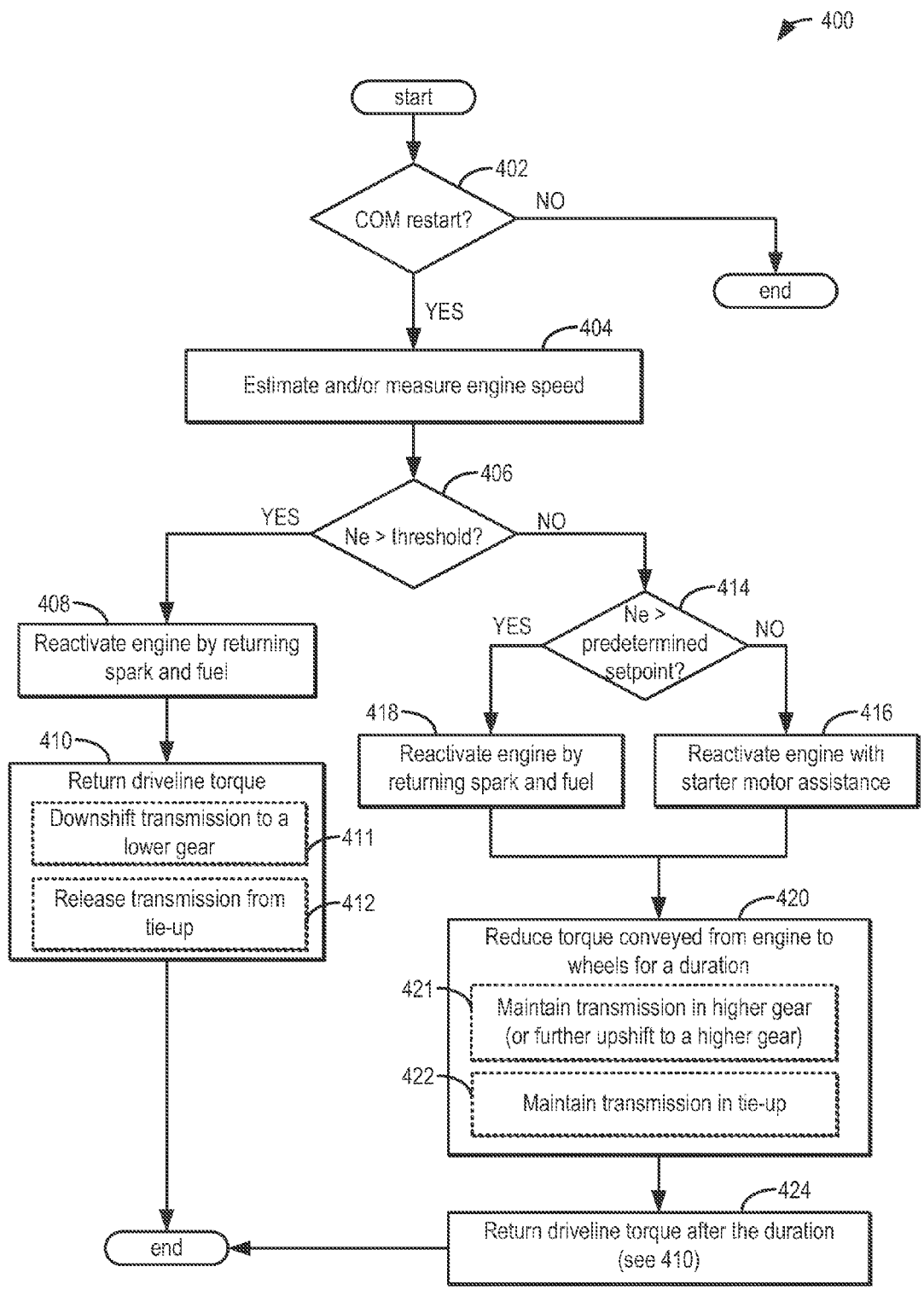
FIG. 4 shows a high level flow chart for restarting the engine in response to a drive change-of-mind request, according to the present disclosure.

Now turning to FIG. 4, an example routine 400 is described for restarting an engine in response to a driver change-of-mind restart request. The routine enables an engine output torque conveyed across the transmission to be adjusted (via transmission gear shift adjustments and/or transmission tie-up adjustments) so that an engine that was spinning down can be restarted before coming to rest, while reducing the negative engine restart torque that is experienced by the driver. The routine of FIG. 4 may be performed as part of the routine of FIG. 3, for example at 322.

At 402, a driver change-of-mind restart may be confirmed. As previously elaborated, the driver change-of-mind restart includes the driver requesting an engine restart during an engine spin-down of an immediately preceding idle-stop, and before the engine is at rest. The driver may request the engine restart by releasing the brake pedal and/or pressing the accelerator pedal. As such, if a driver change-of-mind is not requested, the routine may end.

If a driver change-of-mind restart is confirmed, at 404, the engine speed at which the driver change-of-mind restart request was received may be estimated and/or inferred. As such, other engine operating conditions when the driver change-of-mind restart was requested may also be determined. For example, a vehicle speed and a road incline at which the driver change-of-mind restart request was received may also be determined.

As elaborated below, in response to the driver change-of-mind restart request, the engine controller may be configured to shift (e.g., downshift) the transmission from a first, higher gear to a second, lower gear, wherein a timing of the shifting may be adjusted based on an engine speed at which the driver change-of-mind restart is requested. Additionally, or optionally, in response to the driver change-of-mind restart request, the engine controller may release the transmission from the tie-up. As with the transmission shifting, a timing of the release from tie-up may also be based on the engine speed at which the driver change-of-mind restart is requested. The timing of the shifting and/or release from tie-up may also be based on a vehicle speed and a road incline when the driver change-of-mind restart is requested.

At 406, the engine speed at which the driver change-of-mind restart was requested may be compared to a threshold engine speed. In one example, the threshold speed may be an engine speed at or just below the engine idling speed. As such, the threshold speed may correspond to a speed attained after transitioning through the engine restart speed spike. Since the restart speed spike may not be experienced if the driver change-of-mind restart is initiated at or above this threshold speed, driveline torque may be immediately returned to the vehicle, and torque reduction may be decreased.

If the driver change-of-mind restart is requested above the threshold engine speed, then at 408, the routine may include reactivating the engine by returning fuel injection and spark ignition to the cylinders and resuming cylinder combustion. Further, at 410, driveline torque may be substantially immediately returned to enable the torque from the reactivated engine to be substantially immediately conveyed to the vehicle wheels across the transmission. Reducing driveline torque may include, at 411, immediately shifting the transmission from a first, higher gear (where it was pre-positioned during the preceding idle-stop) to a second, lower gear. Specifically, when the driver change-of-mind is requested above the threshold engine speed, the transmission may be shifted to the second, lower gear before the engine comes to rest. Herein, the first gear is a higher gear having a lower gear ratio than the second gear. Consequently, a lower torque multiplication is achieved in the first gear than in the second gear. The first and second gears may be selected based on an amount of driver demanded torque received during the driver change-of-mind restart. For example, in response to a lower torque demand, the transmission may be downshifted through a smaller number of gears (e.g., from a transmission third gear to a transmission second gear). In comparison, in response to a higher torque demand, the transmission may be downshifted through a larger number of gears (e.g., from a transmission third gear to a transmission first gear). The driver demanded torque may be inferred, for example, from a position of the accelerator pedal, as determined by a pedal position sensor coupled to the accelerator pedal. In another example, the torque demand may be inferred from the position of the brake pedal.

Alternatively, or additionally, at 412, returning driveline torque may include, substantially immediately releasing the transmission from the tie-up, for example, by adjusting the clutch pressure of one or more transmission clutches. Specifically, when the driver change-of-mind is requested above the threshold engine speed, the transmission may be released from the tie-up before the engine comes to rest. In another example, the transmission may have been tied up during the preceding idle-stop with an amount of clutch slippage, and in response to the driver change-of-mind restart request, the amount of clutch slippage may be increased, wherein the amount of clutch slippage is based on the driver demanded torque. For example, as the amount of demanded torque increases, the amount of clutch slippage may be increased. In this way, by reactivating the engine while downshifting the transmission and/or releasing the transmission from tie-up, engine torque may be resumed and driveline torque may be returned.

If the driver change-of-mind restart is requested below the threshold engine speed, the controller may be configured to shift the transmission from the first, higher gear to the second, lower gear after a duration of the restart. For example, when the driver change-of-mind is requested below the threshold speed, the controller may be configured to shift the transmission to the second gear after the engine comes to rest. Likewise, the controller may be configured to release the transmission from the tie-up after or during the engine restart after the engine has come to rest.

In particular, at 412, it may be further determined whether the driver change-of-mind was requested above a predetermined set-point (or lower threshold speed). Herein, the predetermined set-point or lower threshold speed may correspond to an engine speed below which the driver change-of-mind restart may be initiated only after the engine has been brought to a complete stop, and reactivated from stop with starter motor assistance. Consequently, when the driver change-of-mind is requested below the predetermined set-point, at 416, the routine includes waiting for the engine to come to rest, and then reactivating the engine from rest with starter motor assistance. In comparison, when the driver change-of-mind is requested below the threshold engine speed (at 406), but above the predetermined set-point, at 418, the engine may be reactivated by returning cylinder fuel and spark, and resuming cylinder combustion.

In either case, at 420, after reactivating the engine, for at least a duration of the driver change-of-mind restart, an amount of torque conveyed from the spinning engine to the vehicle wheels via the transmission and the torque converter may be reduced. Herein, the duration is a predefined duration required to transition through the engine restart speed spike and reach a threshold engine speed (as further elaborated in FIGS. 5B-C). By reducing the transmission output torque, the vehicle may be better transitioned through the engine restart torque spike with fewer NVH issues. In one example, this may include at 421, maintaining the transmission in the higher gear (as prepositioned during the preceding idle-stop) or further upshifting the transmission to a higher gear. For example, if the engine was shutdown with the transmission in the transmission second gear (gear_2), the engine may be restarted with the transmission maintained in the second gear. Alternatively, for a duration of the restart, the engine may be restarted with the transmission upshifted to a transmission third gear (gear_3).

In another example, reducing the torque output may include, at 422, maintaining the transmission tied-up (as prepositioned during the preceding idle-stop). Alternatively, if the transmission was tied up during the preceding idle-stop with an amount of clutch slippage, the amount of clutch slippage may be decreased to increase the tie-up torque for a duration of the restart. In this way, by reducing the amount of torque conveyed to the vehicle wheels when transitioning through an engine speed spike experienced during an engine restart, NVH issues resulting from the restart negative torque spike can be reduced, and the transition through the torque spike can be smoothened.

After the specified duration, for example, after the engine has transitioned through the engine speed spike and reached the threshold speed, at 420, driveline torque may be returned. As previously elaborated at 410, this may include downshifting the transmission from the higher gear to a lower gear and/or releasing the transmission from the tie-up. By downshifting the transmission and/or releasing the transmission from tie-up, the vehicle may be prepared for an imminent vehicle launch.

As used herein, the first higher gear and the second lower gear refer to a first selected gear and a second selected gear and do not necessarily reflect the transmission first gear (gear_1) or the transmission second gear (gear_2). It will be appreciated that while the routine of FIG. 4 depicts adjusting a timing of the transmission shifting and/or release from tie-up based on the engine speed, the timing may be further based on a vehicle speed and/or a road incline when the driver change-of-mind restart was requested. For example, if the driver change-of-mind restart is requested above a threshold vehicle speed (e.g., before the vehicle has come to a full stop), the transmission downshifting and/or release from tie-up may be delayed until the vehicle has come to the threshold speed (e.g., delayed until the vehicle has come to a full stop).

It will also be appreciated that while the routine of FIG. 4 depicts adjusting a timing of the transmission shifting and/or transmission release from tie-up based on the engine speed when the change-of-mind restart request is received (relative to a predetermined threshold engine speed), in further embodiments, the threshold engine speed may be dynamically adjusted. For example, the target engine speed at which the transmission may be shifted and/or released may be determined as a function of the estimated driver torque demand and/or an accelerator pedal position. In one example, if the driver is requesting a change-of-mind restart by releasing the brake pedal and not applying the accelerator pedal (e.g., lower torque demand), then the engine speed at which the transmission may be shifted and/or released may be a lower threshold speed (e.g., the predetermined set-point). In comparison, if the driver is requesting a change-of-mind restart by releasing the brake pedal and applying the accelerator pedal (e.g., higher torque demand), then the engine speed at which the transmission may be shifted and/or released may be a higher threshold speed. Herein, the higher threshold speed may enable faster vehicle acceleration. In this way, by dynamically adjusting the engine speed at which the shifting occurs based on the driver torque demand, the acceleration potential of the vehicle can be increased.

Figure 5A:
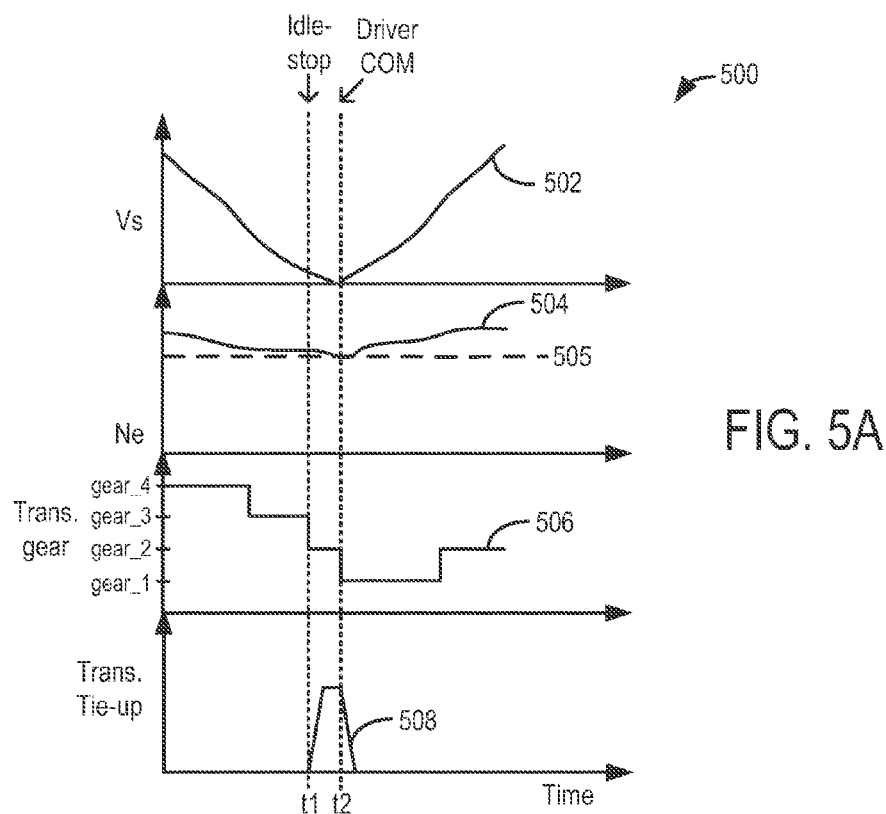
FIGS. 5A-C show maps explaining example engine shutdown and restart procedures, according to the present disclosure.
Figure 5B:
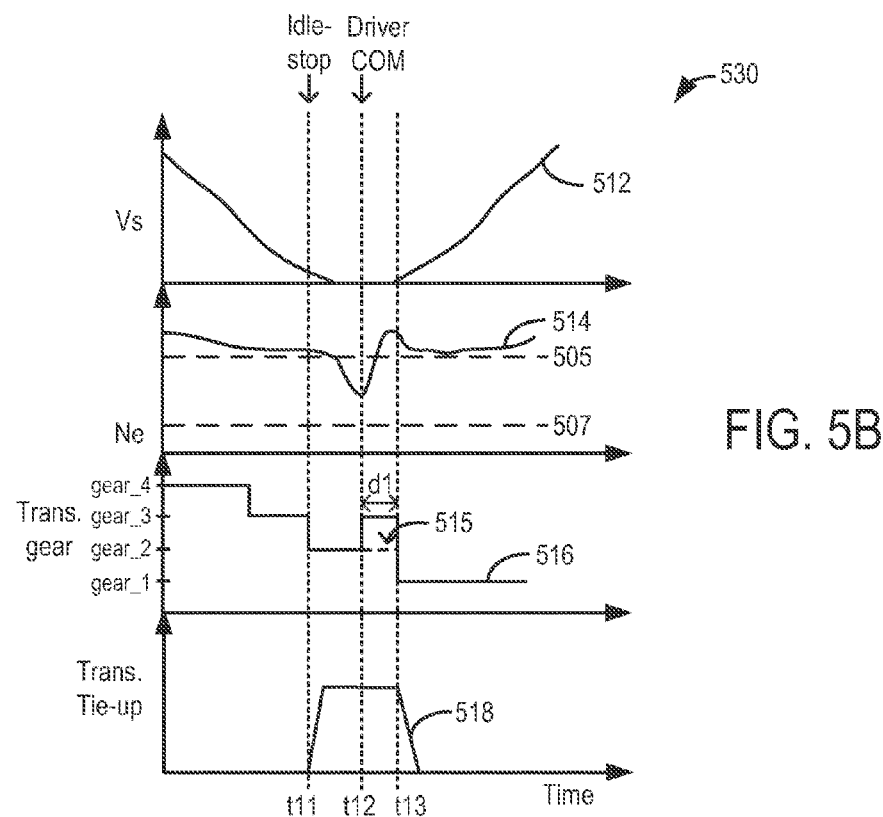
Figure 5C:
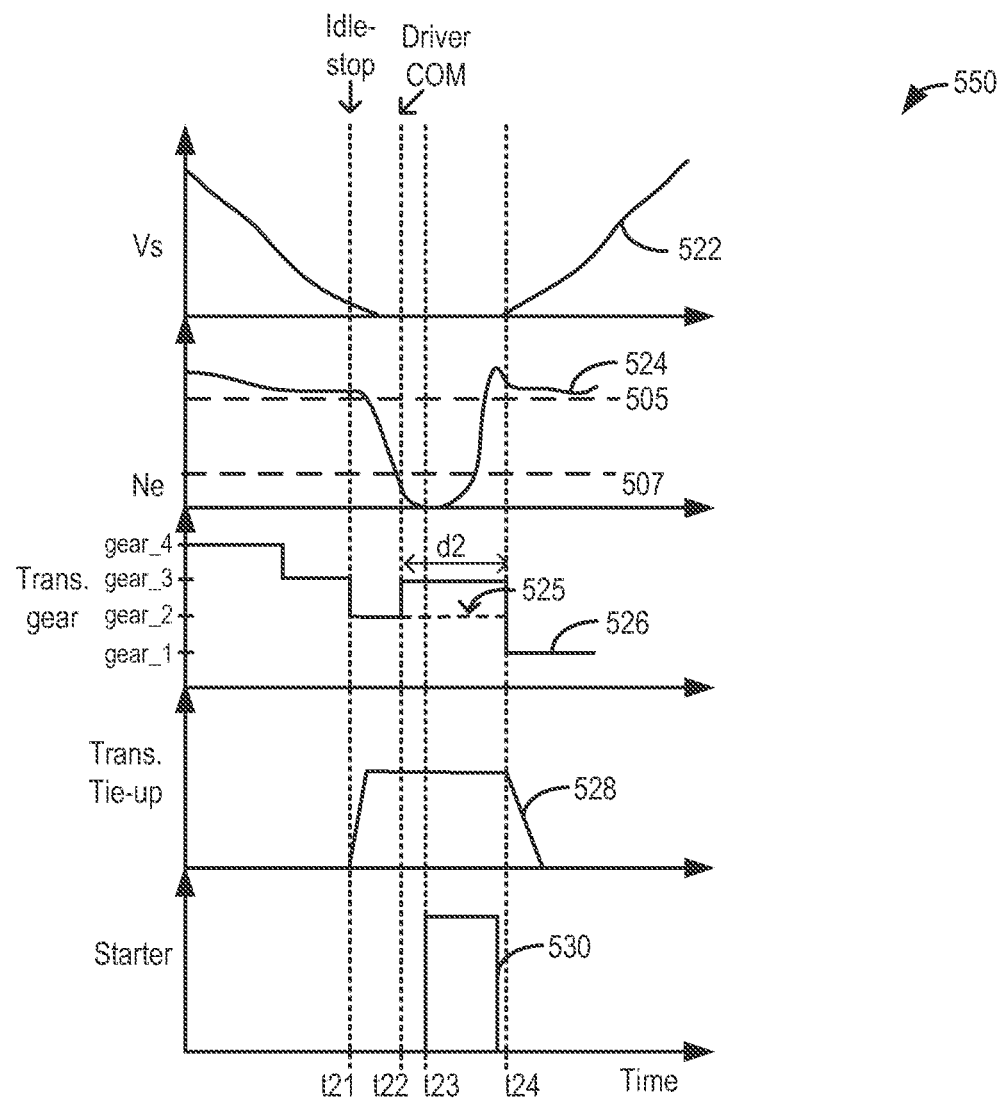

The concepts introduced in the routines of FIGS. 3-4 are now further clarified with example driver change-of-mind restart scenarios in FIGS. 5A-C.

FIG. 5A includes a first map 500 depicting a first example change-of-mind (COM) restart scenario. Changes in vehicle speed (Vs) over time are shown at graph 502. Corresponding changes in engine speed (Ne) are shown at graph 504. Changes in a transmission gear state (Trans. gear) over the same duration are shown at graph 506 while changes in a transmission tie-up state (Trans. tie-up) are shown at graph 508.

In the depicted example, prior to t1, a vehicle operator may request vehicle deceleration, and the vehicle speed may start to decrease (graph 502). At t1, the vehicle speed may fall below a threshold speed and idle-stop conditions may be confirmed. Accordingly, at t1, the engine may be deactivated and the engine may start spinning down (graph 504). As the vehicle speed decreases (before t1), a controller may gradually downshift the transmission from a higher gear (such as a transmission fourth gear (gear_4)) to a lower gear (such as a transmission third gear (gear_3), and then to a transmission second gear (gear_2)). In the depicted example, the transmission may be in the transmission second gear (gear_2) at the time when the idle-stop is initiated (at t1). Additionally, or alternatively, in response to the idle-stop condition at t1, one or more transmission clutches may be engaged to tie-up the transmission to a transmission case during the idle-stop (graph 508). Thus, the engine may be deactivated and spun down with the transmission in gear (graph 506) and/or tied-up (graph 508).

At t2, while the engine is spinning down but before the engine is at rest, and while the vehicle is at rest, the driver may change his mind and request a restart (driver COM). In the depicted example, the COM restart may be requested when the engine speed is above a threshold engine speed 505. In response to the driver COM restart being requested above the threshold speed 505, the engine may be reactivated by returning fuel and spark to the cylinders and resuming cylinder combustion. Further, to improve vehicle acceleration and launch, at t2, the transmission may be downshifted from the higher gear (herein, gear_2) to a lower gear (herein, gear_1). Additionally, or optionally, at t2, in response to the driver COM restart request, the transmission may be released from the tie-up before the engine comes to rest. As a result of the engine reactivation and the transmission downshifting and/or release, the engine speed may start to increase and the vehicle speed may start to increase (graphs 502 and 504). In this way, by downshifting the transmission and/or releasing the transmission from the tie-up before the engine comes to rest in response to the driver change-of-mind restart request, the engine torque can be immediately transmitted to the driving wheels to launch the vehicle.

FIG. 5B includes a first map 530 depicting a second example change-of-mind (COM) restart scenario wherein vehicle speed (Vs) is shown at graph 512, engine speed (Ne) is shown at graph 514, a transmission gear state is shown at graph 516, and a transmission tie-up state is shown at graph 518.

In this example, prior to t11, the vehicle operator may request vehicle deceleration, and the vehicle speed may start to decrease (graph 512). At t11, the vehicle speed may fall below a threshold speed and idle-stop conditions may be confirmed. Accordingly, at t11, the engine may be deactivated and the engine may start spinning down (graph 514). As the vehicle speed decreases (before t1), the controller may gradually downshift the transmission from a higher gear (such as a transmission fourth gear (gear_4)) to a lower gear (such as a transmission third gear (gear_3), and then to a transmission second gear (gear_2)). In the depicted example, the transmission may be in the transmission second gear (gear_2) at the time when the idle-stop is initiated (at t11). Additionally, or alternatively, in response to the idle-stop condition at t11, one or more transmission clutches may be engaged to tie-up the transmission to a transmission case during the idle-stop (graph 518). Thus, the engine may be deactivated and spun down with the transmission operating in gear (graph 516) and/or tied-up (graph 518).

At t12, while the engine is spinning down but before the engine is at rest, and while the vehicle is at rest, the driver may change his mind and request a COM restart. In the depicted example, the COM restart may be requested when the engine speed is below the threshold engine speed 505. In response to the driver COM restart being requested below the threshold speed 505, but above a predetermined set-point 507, the engine may be reactivated by returning fuel and spark to the cylinders and resuming cylinder combustion. As a result of the engine reactivation the engine speed may start to increase. To reduce the effects of the negative engine restart torque spike, at t12, the transmission may be upshifted to a (further) higher gear (herein, upshifted from gear_2 to gear_3) for a duration d1 of the restart. Herein, the duration d1 may correspond to a duration required for the engine to transition through the engine restart speed spike (graph 514). Alternatively, the transmission may be maintained in the higher gear (herein, gear_2), as prepositioned during the preceding idle-stop, over the duration d1 (depicted by dashed line 515). Additionally, or optionally, in response to the driver COM restart request being received below the threshold engine speed, the transmission may be maintained in the tie-up for the duration d1. As a result of the transmission upshifting and/or tie-up, the engine speed spike may be transitioned through with fewer clunks and bumps.

At t13, after duration d1 has elapsed, wherein the engine torque spike has been transitioned through and the engine has reached the threshold speed, the transmission may be shifted (e.g., downshifted) from the higher gear to a lower gear (herein, from gear_3 to gear_1). Additionally, or optionally, at t13, the transmission may be released from the tie-up during the engine restart. As a result of the transmission downshifting and/or release from tie-up, the vehicle speed may start to increase. In this way, by upshifting the transmission and/or tying up the transmission for a duration of the restart, the change-of-mind restart negative torque spike can be reduced. By subsequently downshifting the transmission and/or releasing the transmission from the tie-up during the engine restart, the torque spike can be blended with the vehicle acceleration.

FIG. 5C includes a third map 550 depicting a third example change-of-mind (COM) restart scenario. Changes in vehicle speed (Vs) over time are shown at graph 522, corresponding changes in engine speed (Ne) are shown at graph 524, changes in a transmission gear state are shown at graph 526, changes in a transmission tie-up state are shown at graph 528, and starter motor operation is shown at graph 530.

In the depicted example, prior to t21, a vehicle operator may request vehicle deceleration, and the vehicle speed may start to decrease (graph 522). At t21, the vehicle speed may fall below a threshold and idle-stop conditions may be confirmed. Accordingly at t21, the engine may be deactivated and the engine may start spinning down (graph 524). As the vehicle speed decreases (before t1), a controller may gradually downshift the transmission from a higher gear (such as a transmission fourth gear (gear_4)) to a lower gear (such as a transmission third gear (gear 3), and then to a transmission second gear (gear_2)). In the depicted example, the transmission may be in the transmission second gear (gear_2) at the time when the idle-stop is initiated (at t21). Additionally, or alternatively, in response to the idle-stop condition at t21, one or more transmission clutches may be engaged to tie-up the transmission to a transmission case during the idle-stop (graph 528). Thus, the engine may be deactivated and spun down with the transmission in gear (graph 526) and/or tied-up (graph 528).

At t22, while the engine is spinning down but before the engine is at rest, and while the vehicle is rest, the driver may change their mind and request a restart (driver COM). In the depicted example, the COM restart may be requested when the engine speed is below the threshold engine speed 505 and below the predetermined set-point 507, in response to which engine restart may be delayed until the engine has come to a complete rest at t23. At t23, the engine may be restarted from the rest by reactivating the engine with starter motor assistance (graph 530) and by returning fuel and spark to the cylinders and resuming cylinder combustion. As a result of the engine reactivation the engine speed may start to increase. Further, to reduce the effects of the negative engine restart torque spike, at t22, in response to the drive change-of-mind restart request, the transmission may be upshifted to a further higher gear (herein, upshifted from gear_2 to gear_3) for a duration d2 of the restart. Herein, the duration d2 may be larger than the duration d1 of FIG. 5B as it corresponds to a duration required for the engine to come to a complete rest, be restarted with starter motor assistance, and then transition through the engine restart speed spike (graph 524). Alternatively, the transmission may be maintained in the higher gear (herein, gear_2) over the duration d2 (depicted by dashed line 525). Additionally, or optionally, in response to the driver COM restart request being received below the threshold engine speed, the transmission may be maintained in the tie-up for the duration d2 and released from the tie-up during or after the engine restart at t24. As a result of the transmission upshifting and/or tie-up, the engine speed spike may be transitioned with fewer clunks and bumps.

After duration d2 has elapsed, and the engine has transitioned through the engine torque spike to reach the threshold speed, at t24, the transmission may be shifted from the higher gear to a lower gear (herein, from gear_3 to gear_1). Additionally, or optionally, at t24, the transmission may be released from the tie-up. As a result of the transmission downshifting and/or release from tie-up, the vehicle speed may start to increase. Herein, in comparison to the examples of FIGS. 5A-B, the transmission shifting and/or release during reactivation may occur only after the engine has come to rest.

In this way, a combination of transmission shifting and tie-up may be advantageously used before an engine comes to rest to reduce the change-of-mind negative torque transfer through the transmission clutches. By reducing the negative torque transfer, the engine may be rapidly restarted in response to a sudden driver change-of-mind with fewer clunks and bumps. Overall, the quality of the change-of-mind restart can be improved.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a vehicle engine coupled to a transmission, comprising:
during an automatic engine idle-stop, operating the transmission in a first, higher gear; and
in response to a driver change-of-mind restart, shifting the transmission to a second, lower gear, wherein the first gear and the second gear are selected based on a driver demanded torque.

2. The method of claim 1, wherein a timing of the shifting includes,
when the driver change-of-mind restart is requested above a threshold engine speed, immediately shifting the transmission to the second gear; and
when the driver change-of-mind restart is requested below the threshold engine speed, shifting the transmission to the second gear after a duration of the driver change-of-mind restart.

3. The method of claim 1, wherein a timing of the shifting based on engine speed includes,
when the driver change-of-mind restart is requested above a threshold engine speed, shifting the transmission to the second gear before the engine comes to rest; and
when the driver change-of-mind restart is requested below the threshold engine speed, shifting the transmission to the second gear after the engine comes to rest.

4. The method of claim 3, wherein the threshold engine speed is based on a driver demanded torque.

5. The method of claim 1, wherein a timing of the shifting is further based on a vehicle speed and a road incline when the driver change-of-mind restart is requested.

6. The method of claim 1, wherein the driver change-of-mind restart includes a driver requesting an engine restart during an engine spin-down of the idle-stop, before the engine is at rest, and while the vehicle is stationary.

7. The method of claim 6, further comprising shifting the transmission to the second gear after the engine comes to rest if no driver change-of-mind restart is requested during the engine spin-down of the idle-stop.

8. A method of operating an engine coupled to a transmission, comprising:
in response to an automatic engine idle-stop, tying up the transmission to a transmission case; and
in response to a driver change-of-mind restart, releasing the transmission from the tie-up, wherein tying up the transmission includes tying up the transmission with an amount of clutch slippage, and wherein releasing the transmission from the tie-up includes increasing the amount of clutch slippage.

9. The method of claim 8, wherein a timing of the release is based on one or more of an engine speed, a vehicle speed, and a road incline when the driver change-of-mind restart is requested.

10. A method of operating an engine coupled to a transmission, comprising:
in response to an automatic engine idle-stop, tying up the transmission to a transmission case; and
in response to a driver change-of-mind restart, releasing the transmission from the tie-up, wherein a timing of the release is based on one or more of an engine speed, a vehicle speed, and a road incline when the driver change-of-mind restart is requested, and, wherein the timing of the release includes,
when the driver change-of-mind restart is requested above a threshold engine speed, releasing the transmission from tie-up before the engine comes to rest; and
when the driver change-of-mind restart is requested below the threshold engine speed, releasing the transmission from tie-up after or during an engine restart.

11. The method of claim 10, wherein tying up the transmission includes tying up the transmission with an amount of clutch slippage, and wherein releasing the transmission from the tie-up includes increasing the amount of clutch slippage.

* * * * *